United States Patent [19]
Heiser

[11] 3,710,935
[45] Jan. 16, 1973

[54] CHECKING AND SORTING DEVICE
[75] Inventor: James L. Heiser, Hinckley, Ohio
[73] Assignee: Park-Ohio Industries, Inc., Cleveland, Ohio
[22] Filed: Oct. 5, 1970
[21] Appl. No.: 78,054

[52] U.S. Cl. .................... 209/73, 209/80, 209/82
[51] Int. Cl. ............................................... B07c 5/08
[58] Field of Search............ 209/80, 74, 73, 82, 88, 90

[56] References Cited

UNITED STATES PATENTS

| | | | |
|---|---|---|---|
| 1,612,023 | 12/1926 | Huber | 209/80 X |
| 3,623,604 | 11/1971 | Roberts | 209/80 |
| 3,133,639 | 5/1964 | Spier et al. | 209/88 |

*Primary Examiner*—Allen N. Knowles
*Assistant Examiner*—Gene A. Church
*Attorney*—Meyer, Tilberry and Body

[57] ABSTRACT

A device for checking run-out in elongated generally cylindrical shaft elements and for sorting those shafts which have more than a predetermined acceptable amount of run-out from the others as they are individually checked. The device comprises shaft support members which establish a rolling plane; contact elements coextensive with the support members, spaced below the rolling plane a distance equal to the amount of allowable run-out; sensing means for sensing shaft contact with the contact element; and, separator means for separating those shafts making contact from those which do not. In operation, a shaft is rolled down the rolling plane toward a first staging area. If, during this rolling travel, the shaft contacts the contact element, it is diverted to a second staging area, remote from the first staging area, for salvage or scrap processing.

7 Claims, 4 Drawing Figures

INVENTOR.
JAMES L. HEISER
BY
Meyer, Tilberry & Body
ATTORNEYS

CHECKING AND SORTING DEVICE

This application pertains to the art of testing equipment and more particularly to apparatus for detecting transverse run-out of cylindrical shaft elements.

The invention is particularly applicable to checking run-out in elongated generally cylindrical automobile camshafts and will be described with particular reference thereto, however; it will be appreciated that the invention has broader applications and may be employed in testing other types of elongated generally cylindrical workpieces where it is necessary to ascertain whether each shaft has less than a predetermined amount of transverse run-out. Other applications will be apparent to those skilled in the art.

Generally, camshafts to which this invention is directed are forged and, over the course of the production period, receive a plurality of heat treatments. These heat treatments cause warping, or run-out, in the shafts even though extensive precautions are taken to insure that the run-out problem will be held to a minimum. In order for a camshaft to be commercially acceptable, it is necessary that the run-out contained therein be controlled to a minimum. Prior to the time of the subject invention, there were two methods generally utilized for checking the shafts.

The first was to place each shaft between centers coaxial with the longitudinal axis. Each shaft was then rotated at high speed and, if the shaft contacted a preset gauge element disposed from the axis a distance equal to the allowable run-out, the shaft was automatically rejected from the testing apparatus into a salvage or scrap bin. One of the principal problems with testing apparatus of this type has been the amount of time to set-up each shaft for testing, the amount of time for actual testing and the cost of the actual testing apparatus itself. More particularly, because of the excessive setup and running time, it was found that it was impossible to test each shaft and still keep pace with the production line output. Therefore, often only randomly selected shafts were checked. This, of course, was unacceptable.

The second method heretofore used was to not only check but straighten each shaft as it came off of the production line. This was accomplished by again placing the shafts between centers coaxially with their longitudinal axis and rotating them at high speed. A straightening tool was then brought into forced contact with each shaft until it attained such a condition so as to be considered acceptable. The straightening tool was then backed off from the shaft and the shaft removed from the straightening apparatus. This type of checking method had the obvious problem that extremely expensive machinery was required in order to hold the shafts in position while being rotated and further, expensive machinery was also required to effect the actual straightening. Testing apparatus life was extremely short and unpredictable so that again, it was often impossible to keep pace with the production lines themselves.

The present invention contemplates a new and improved apparatus and method which overcome all the above referred problems and others generally associated with prior apparatus, and provides a new checking apparatus which is less expensive, easy to operate, shortens testing time and decreases the amount of machine downtime.

In accordance with the present invention, there is provided a device for sensing a predetermined amount of transverse run-out in elongated generally cylindrical shaft elements. The device includes means for defining a rolling plane, at least one contact element coextensive with the rolling plane and spaced therebelow a variable distance generally corresponding to the amount of predetermined run-out, and sensing means which detect shaft engagement with both the rolling plane and contact element.

In accordance with another aspect of the present invention, shaft separator means responsive to the sensing means to separate those shafts making contact with both the rolling plane and contact element from those which do not.

In accordance with another aspect of the present invention, a method is provided for sensing run-out within predetermined allowable limits in elongated generally cylindrical shafts which includes the steps of: rolling shaft elements along means defining a rolling plane; sensing contact between the shafts and a contact area spaced from the rolling plane a distance equal to the allowable run-out as the shafts roll along the plane; and, separating those shafts making contact from those which do not.

The principal object of the invention is to provide an apparatus and method for sensing a predetermined amount of transverse run-out in elongated generally cylindrical shaft elements.

Another object of the present invention is to provide an apparatus and method whereby those shaft elements exceeding the predetermined amount of transverse run-out are separated from the other shaft elements.

Another object of the present invention is to provide an apparatus and method which permits checking cylindrical shaft elements for a predetermined amount of transverse run-out with a minimum of operator handling and set-up time.

Still another object of the present invention is to provide an apparatus and method for checking elongated generally cylindrical shaft elements for a predetermined amount of transverse run-out at the end of a production line which will be able to check each shaft as it comes off of the line.

The invention may take a physical form in certain parts and arrangements of parts, a preferred embodiment of which will be described in detail in the specification and illustrated in the accompanying drawings which form a part hereof and wherein.

Figure 1:
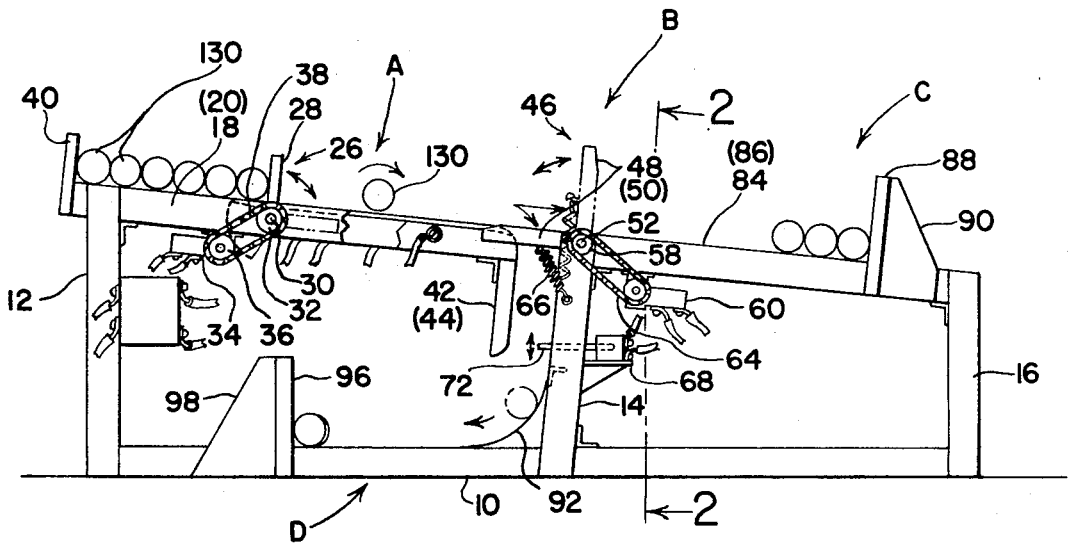
FIG. 1 is a side view of the apparatus of the subject invention.

Referring now to the drawings wherein the figures are for the purpose of illustrating the preferred embodiment of the invention only and not for purposes of limiting same, FIG. 1 shows the checking and sorting device of this invention which is comprised of checking portion A, separating portion B, first staging area C and second staging area D. The overall device is mounted on interconnected base frame members 10, upright end frame members 12, upright central frame 14 and upright end frame members 16.

Figure 2:
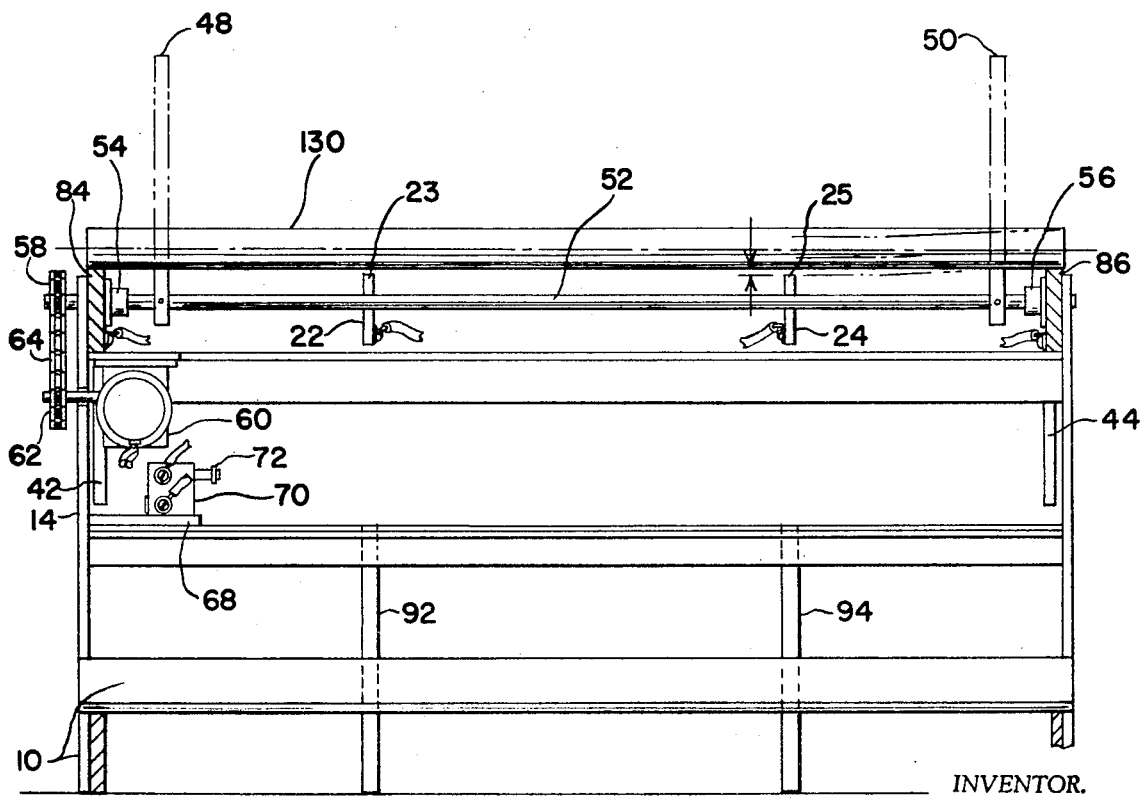
FIG. 2 is a cross-sectional view of FIG. 1 taken along lines 2—2.

As best shown in FIG. 1 and FIG. 2, two shaft support members 18, 20 are mounted to upright end frame member 12 in any convenient manner such as for example by welding. The shaft supports are in a spaced apart parallel relationship with the distance therebetween being equal to slightly less than the overall length of the cylindrical shafts to be tested. This distance could, of course, be made adjustable to accommodate different shaft lengths. Shaft supports 18, 20 define a rolling plane for the cylindrical shaft members which slopes in a gradually downward direction from its mounted position on end frame members 12 sufficient so as to allow those shaft members to be checked to roll down the rolling plane under the influence of gravity. Further, members 18,20 are constructed from an electrically conductive material such as cold roll steel. Two shaft contact members 22,24 are similarly mounted to end frame members 12 between and electrically isolated from supports 18,20 and extend longitudinally coextensive therewith. Members 22,24 are also electrically conductive. It is to be appreciated that the number of contact members is not necessarily limited to two and that a greater or lesser member may be used depending on specific areas along the shaft members which are desired to be checked. In the preferred embodiment, however, two such contact members are utilized and they are generally spaced between shaft support members 18,20 so as to check run-out at the bearing areas. Upper surfaces 23,25 of contact members 22,24 respectively define a contact plane which is spaced below the rolling plane established by shaft supports 18,20. It is to be understood that these contact members may be adjustable through conventional means so as to allow a variation in the distance between these planes. The distance between surfaces 23,25 and the rolling plane is equal to the predetermined allowable amount of transverse run-out permitted to appear in the shaft elements themselves.

A shaft stop generally designated 26 is mounted between shaft support members 18,20 spaced from the uppermost ends thereof in order to provide means whereby several elongated shaft members may be maintained in a staging position and released therefrom one at a time to be checked and sorted. Shaft stop 26 includes a plurality of stop gates 28, stop mounting shaft 30, mounting shaft drive sprocket 32, shaft stop gate drive means 34, drive means drive sprocket 36 and belt 38. The stop mounting shaft 30 is conveniently journaled between shaft supports 18, 20 such as for example standard pillow blocks. The end of shaft 30 associated with shaft support 18 extends through the support and receives thereon drive sprocket 36. Although only one stop gate 28 is shown in FIG. 1, it is to be appreciated that a plurality of these gates are utilized in spaced apart relation along shaft 30 between supports 18, 20. These stop gates are affixed to shaft 30 in any convenient manner such as shaft receiving blocks (not shown). Mounted on the underside of shaft support 18 is shaft stop gate drive means which includes drive sprocket 36 integral therewith. Belt means 38 endlessly interconnects drive sprocket 32, 36. By energizing the drive means, shaft 30 and ultimately stop gate 28 may be rotated clockwise in the view of FIG. 1 so as to allow a shaft member to roll from the staging position along the rolling plane to be checked and sorted. When the gate members are in the lowered position, they extend below the lowest possible adjustment of surfaces 23, 25 in order that they will not interfere with the proper functioning of the device. After a shaft member has rolled past shaft stop assembly 26, the drive means may be reversed in order that the stop mounting shaft and stop gates will be raised to restrain the other shaft members.

Mounted at the lowest extremities of the shaft supports 18, 20 are shaft guides 42, 44. These guides extend in a generally downward direction and may be affixed to the shaft support members in any convenient manner, such as, for example, welding.

Adjacent to but spaced from checking portion A is separating portion B which includes a gate assembly generally designated 46 which is mounted to and in relation with central frame members 14. Gate assembly 46 includes gate arms 48,50, gate arm mounting shaft 52, shaft bearings 54, 56, gate assembly drive sprocket 58, gate assembly drive means 60, drive means sprocket 62 and drive belt 64. Shaft 52 is received in shaft bearings 54, 56 which are themselves conveniently mounted to upright central frame members 14. Gate arms 48, 50 are conveniently mounted to shaft 52 by, for example, block shaft receivers. One end of shaft 52 extends through and beyond its associated frame member 14 and receives thereon gate assembly drive sprocket 58. Gate assembly drive means 60 includes a drive sprocket 62 which is interconnected with sprocket 58 by endless drive belt 62. When drive means 60 is energized, gate arms 48, 50 are moved from a first position generally co-extensive with shaft support 18, 20 to a second switched position transverse to the shaft support. This creates an open area between the lower extremities of shaft supports 18, 20 and gate assembly 46. As shown in FIG. 1, each gate arm includes a gate assembly return tension spring 66, one end of which is attached to its associated gate arm and the other end of which is secured to one of the central frame members 14. When the gate assembly is shifted to its second position, springs 64 are stretched so as to provide a quick and easy return mechanism for returning the gate assembly to the first position. Conveniently mounted on switch bracket 68 is shaft detector switch 70 which includes switch arm 72 extending into the path of and to be moved by those shaft elements entering staging area D. Drive means 60 and switch 70 are electrically interconnected so that when switch arm 72 is moved so as to de-energize switch 70, drive means 60 is also de-energized. Springs 66 are then able to return the gate assembly to its first, normal position.

First staging area C is located immediately adjacent separating portion B and extends between central frame members 14 and end frame members 16. This staging area is comprised of second shaft support members 84, 86 and first staging area stop 88. The second shaft supports are coextensive with first shaft supports 18, 20 and first staging area stop 88 extends therebetween at the lowermost endpoints. Further included is backup support 90 which reinforces first staging area stop 88.

Second staging area D includes shaft guides 92, 94 second staging area stop 96 backup member 98 and a portion of the interconnecting base frame members 10. Shaft guides 92, 94 are located between base frame members 10, 14 and are radiused so as to break the fall of shaft members entering the second staging area and further to direct them towards stop 96. Again, stop 96 extends transversely between frame members 10 and backup member 98 adds rigidity to the stop to help absorb the force of the shafts as they are received in the second staging area.

Figure 3:
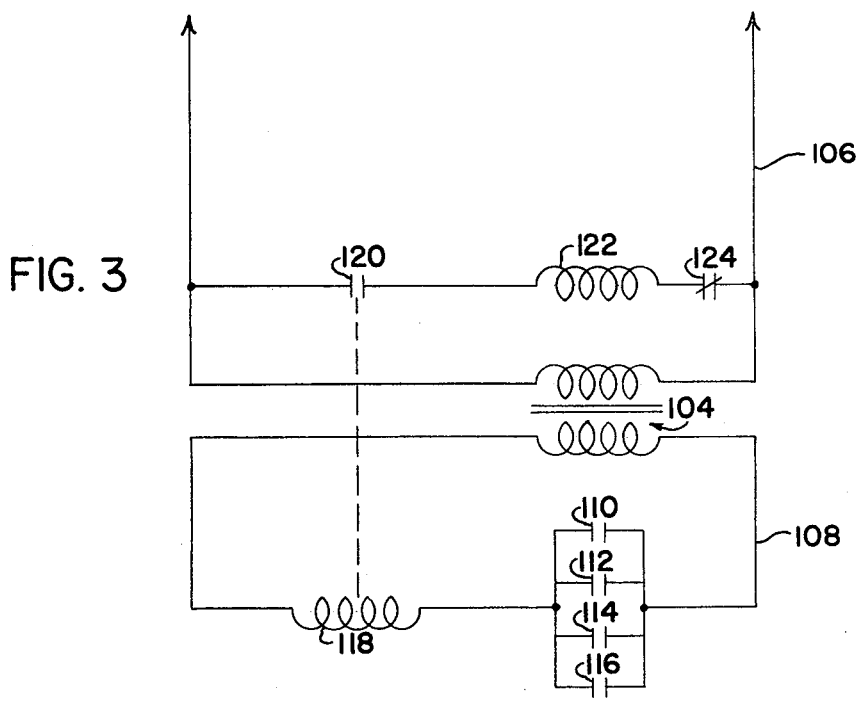
FIG. 3 is an electrical schematic of the operative portion of the subject invention; and, FIG. 4 is an end view of a second embodiment of the subject invention showing a second arrangement for the rolling plane and shaft contact elements.

FIG. 3 is an operational electrical schematic diagram of the main components of this invention and includes transformer 104 connecting primary circuit 106 and secondary circuit 108. The secondary circuit includes relay contacts 110, 112, 114 and 116 connected parallel with each other and in series with coil 118 of a relay. Primary circuit 106 includes relay contact 120 interconnected with relay coil 118, relay coil 122 of drive means 60 and normally closed relay contact 124 of shaft detector switch 70. The operation of stop gate assembly 26 is not shown in FIG. 3, but it is to be appreciated that it may be interconnected with the circuit so as to synchronize the action of gate arms 28 with the remainder of the checking and sorting device.

In operation, it is first necessary to set surfaces 23, 25 a distance from the rolling plane equal to the amount of allowable transverse run-out in the elongated shaft elements to be checked. Following this, one of a plurality of shaft elements 130 may be released from the initial staging area by the action of stop gate assembly 26. Since the rolling plane generally slopes downward, each shaft will be directed by gravity along the rolling plane. This rolling action permits the overall peripheral surface of each shaft element 130 to be checked. Should the transverse run-out in a particular shaft be more than the predetermined allowable amount, simultaneous contact will be made between surfaces 23, 25 of contact elements 22, 24 and shaft supports 18, 20. The result of this simultaneous contact is that relay contacts 110, 112, 114 and 116 are all closed in the low voltage secondary circuit to thereby energize relay coil 118. This closes relay contact 120 in the primary circuit and energizes coil 122 of drive means 60. When drive means 60 is energized, gate means 48, 50 are moved from their first coextensive position with shaft supports 18, 20 to their second position generally transverse thereto. This, of course, creates a void between shaft guides 42, 44 and central frame members 14. When the elongated shaft 130 being checked reaches this area, it will fall therethrough tripping switch arm 72 of shaft detector switch 70. In the circuit of FIG. 3, this action opens normally closed contact 124 to thereby de-energize drive means 60. Shaft 130 then is guided along shaft guides 92, 94 and along base frame members 10 to the second staging area stop 96. Once drive means 60 has been de-energized, gate assembly return springs 66 will return the gate assembly to its first coextensive position with shaft supports 18, 20, and at this point, another shaft 130 may be released from the initial staging area by the action of shaft stop assembly 26. These shafts 130 which contain less than the minimum amount of allowable run-out are permitted to roll down the rolling plane, across gate arms 48, 50 and along second shaft support members 84, 86 to the first staging area stop. Those shaft members at both first staging area C and second staging area D may be removed as necessary, those in area C being satisfactory without further work, those in area D requiring either salvage or scrapping. It will be appreciated that the operation of separating portion B could be altered so that acceptable parts pass into second staging area D and unacceptable parts pass into first staging area C.

Figure 4:
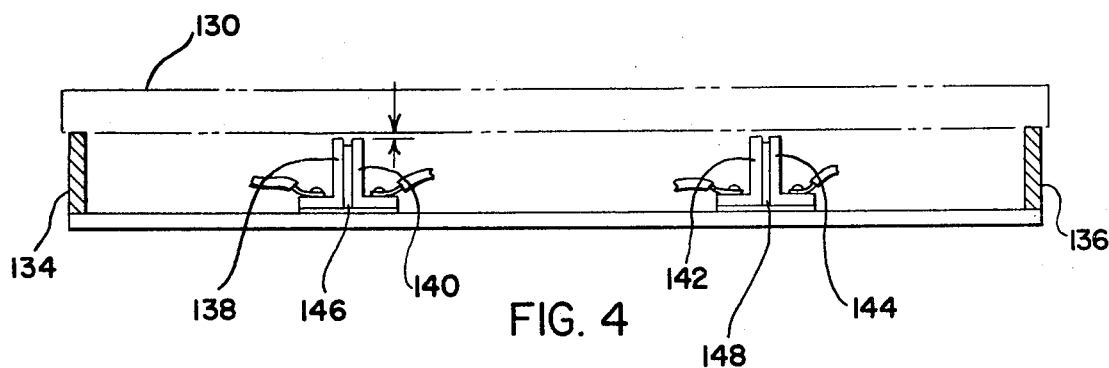

FIG. 4 represents a variation of the subject invention which also may be used. In FIG. 4, shaft supports 134, 136 are shown in combination with the contact elements 138, 140, 142 and 144. Mounted between elements 138, 140 is insulator bar 146 and mounted between contact elements 142, 144 is insulator bar 148. In this manner, contact elements 138, 142 and 140, 144 respectively may be connected electrically in series. This permits a somewhat more refined testing apparatus in that each contact element may be considered to extend effectively across a greater transverse portion of the testing area.

The invention has been described with reference to the preferred embodiment. Obviously, modifications and alterations will occur to others upon the reading and understanding of this specification. It is my intention to include all such modifications and alterations insofar as they come within the scope of the appended claims or the equivalence thereof.

Having thus described my invention, I claim:

1. A device for sensing a predetermined amount of transverse run-out in an elongated, generally cylindrical shaft, said shaft having a longitudinal axis, said device comprising:

means for defining a rolling plane for rolling movement of said shaft in a selected direction, said rolling plane defining means comprising a pair of spaced apart elongated shaft support members extending generally longitudinally parallel to each other, said shaft support members each including first and second end portions with one of said end portions being vertically disposed higher than the other of said end portions;

a pair of spaced apart elongated contact elements disposed between and extending generally longitudinally parallel to said support members coextensive with said selected direction and spaced below said plane a distance x generally corresponding to said predetermined amount of run-out, said contact elements having a length sufficient to extend substantially the length of said plane; and, electrical sensing means for sensing engagement of said shaft with either one of said pair of contact elements while said shaft is rolled along said rolling plane in said selected direction.

2. The device as defined in claim 1 further including shaft separator means responsive to said sensing means for separating the shafts engaging said element.

3. The device as defined in claim 2 wherein said separator means comprises shiftable means for directing said shafts into one of a first shaft receiving structure and a second shaft receiving structure, said second structure being distinct from said first structure.

4. The device as defined in claim 1 wherein each of said contact elements is comprised of two contact members disposed in a side-by-side electrically insulated relationship relative to each other.

5. In a device for sensing a predetermined amount of transverse runout in an elongated, generally cylindrical shaft and including means for establishing a rolling plane for rolling movement of said shaft in a selected direction; at least one contact element disposed coextensive with said selected direction extending partially along the length of said plane and spaced therebelow a distance x generally corresponding to said predetermined amount of run-out; and, electrical sensing means for sensing engagement of said shaft with said contact element, the improvement comprising:

said rolling plane being defined by a pair of spaced apart elongated shaft support members extending longitudinally parallel to each other and said at least one contact element comprising a pair of spaced apart elongated contact elements disposed between and extending generally longitudinally parallel to said support members over substantially the entire length of said rolling plane.

6. A device for sensing a predetermined amount of transverse run-out in an elongated, generally cylindrical shaft, said device comprising:

a pair of spaced apart elongated shaft support members extending generally longitudinally parallel to each other for defining a rolling plane for rolling movement of said shaft in a selected direction, said support members each including first and second end portions with one of said end portions being vertically disposed higher than the other of said end portions;

a pair of spaced apart elongated contact elements disposed between and extending generally longitudinally parallel to said support members coextensive with said selected direction and spaced below said plane a distance x generally corresponding to said predetermined amount of run-out, said contact elements having a length sufficient to extend substantially the length of said plane; and, electrical sensing means for sensing engagement of said shaft with either of said contact elements while said shaft is rolled along said rolling plane in said selected direction.

7. The device as defined in claim 6 including shaft separator means responsive to said sensing means for separating a shaft engaging said elements from a shaft not engaging said elements, said separating means comprising shiftable means for directing said shafts into one of a first and second shaft receiving structures, said second structure being distinct from said first structure.

* * * * *